(12) United States Patent
Steele

(10) Patent No.: US 7,438,090 B2
(45) Date of Patent: Oct. 21, 2008

(54) BOOSTER VALVE

(75) Inventor: James R. Steele, Stillwater, MN (US)

(73) Assignee: Dynamic Air Inc.

( * ) Notice: Subject to any disclaimer, the term of this patent is extended or adjusted under 35 U.S.C. 154(b) by 289 days.

(21) Appl. No.: 11/030,746

(22) Filed: Jan. 6, 2005

(65) Prior Publication Data

US 2006/0144453 A1 Jul. 6, 2006

(51) Int. Cl.
F16K 15/14 (2006.01)
(52) U.S. Cl. .................... 137/854; 137/843; 137/515.5; 137/533.21
(58) Field of Classification Search ................. 137/515, 137/515.5, 512.15, 854, 454.2, 454.6, 528, 137/533.17, 533.21, 843; 251/358, 118
See application file for complete search history.

(56) References Cited

U.S. PATENT DOCUMENTS

| 3,354,903 | A | * | 11/1967 | Caruso | 137/512.15 |
| 3,708,207 | A | * | 1/1973 | Steele | 406/93 |
| 3,954,121 | A | | 5/1976 | Kardos | |
| 4,204,555 | A | * | 5/1980 | Durling | 137/102 |
| 4,482,276 | A | * | 11/1984 | Chouinard | 406/169 |
| 4,513,784 | A | * | 4/1985 | Farrand et al. | 137/854 |
| 4,535,820 | A | | 8/1985 | Raines | |
| 4,765,372 | A | | 8/1988 | Beecher | |
| 5,014,739 | A | * | 5/1991 | Csaszar | 137/512.15 |
| 5,218,993 | A | * | 6/1993 | Steinberg et al. | 137/515.5 |
| 5,419,366 | A | * | 5/1995 | Johnston | 137/493.7 |
| 5,465,857 | A | * | 11/1995 | Yang | 215/228 |
| 5,601,112 | A | * | 2/1997 | Sekiya et al. | 137/512.15 |
| 5,860,449 | A | * | 1/1999 | Schulte | 137/550 |
| 6,412,514 | B1 | * | 7/2002 | Raftis | 137/111 |
| 6,648,004 | B2 | * | 11/2003 | Lau | 137/223 |

FOREIGN PATENT DOCUMENTS

DE 3410186 A1 9/1985

* cited by examiner

Primary Examiner—Kevin L Lee
(74) Attorney, Agent, or Firm—Jacobson & Johnson

(57) ABSTRACT

A flow valve having sealing member having a first condition for engaging a housing to prevent back flow and a platform for obstructing a flow passage through the flow valve with the platform supporting the sealing member in an out-of-the-way condition to allow fluid to flow through the flow valve.

29 Claims, 11 Drawing Sheets

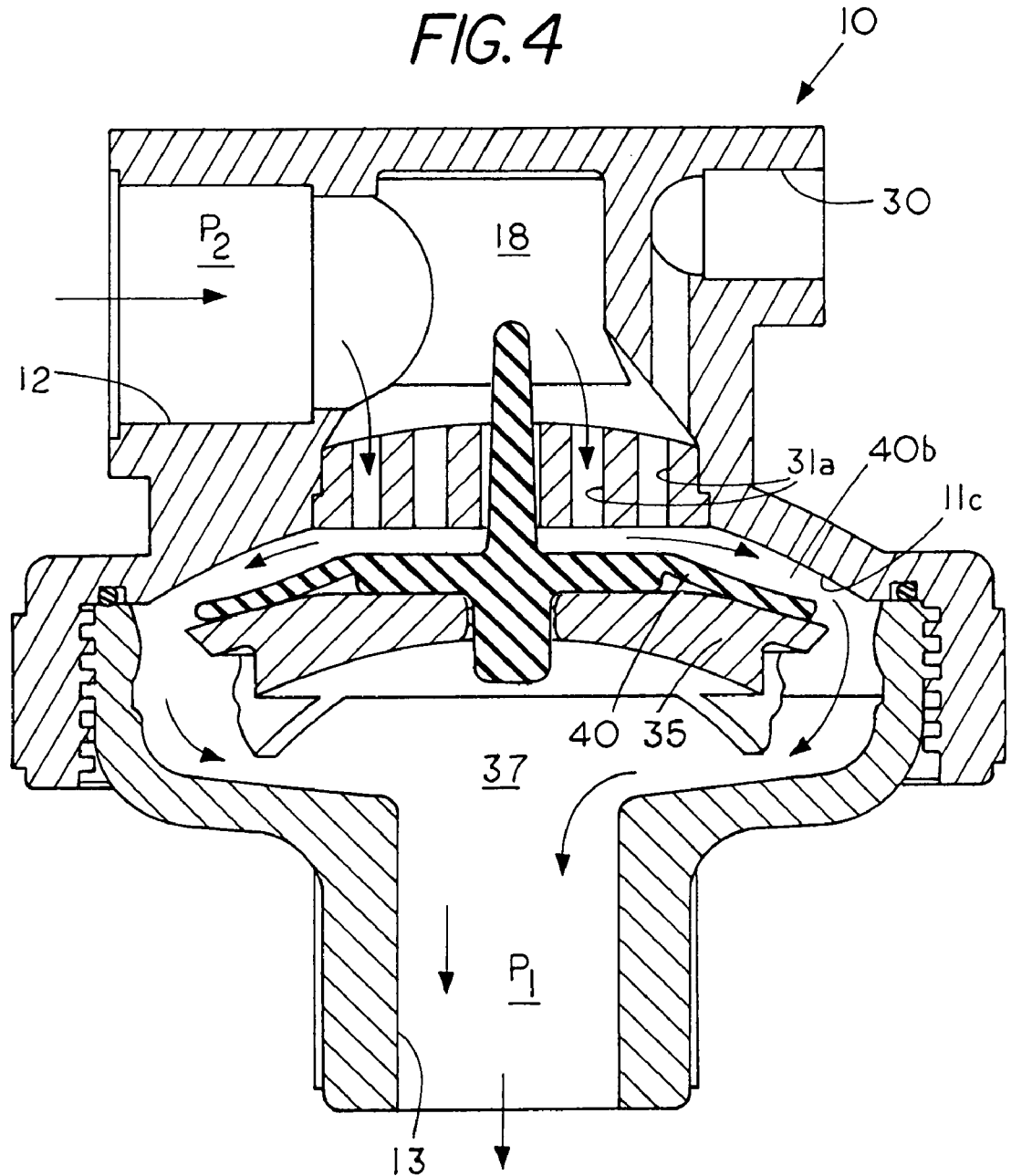

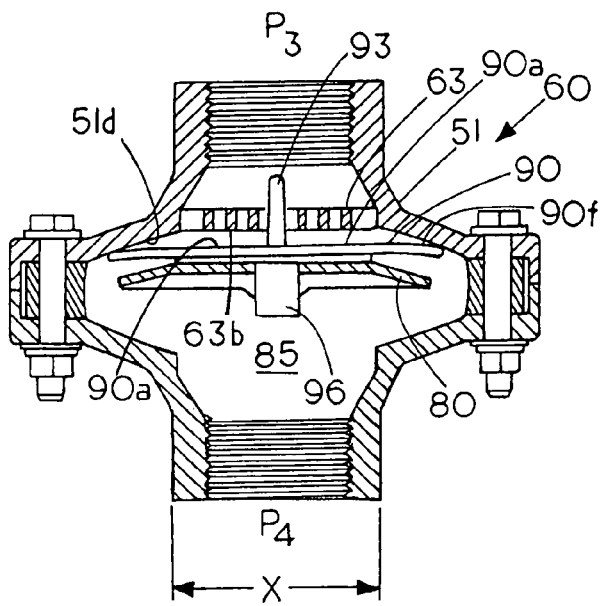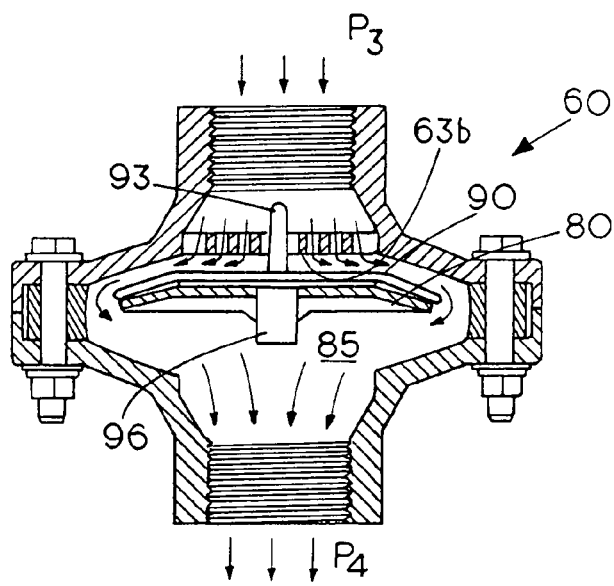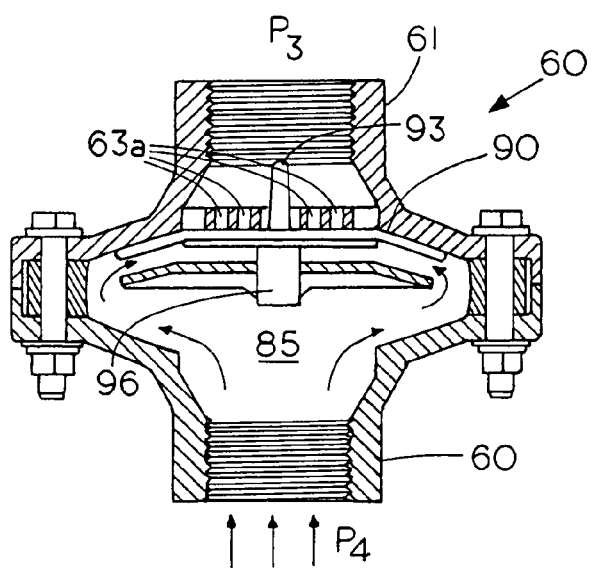

BOOSTER VALVE

FIELD OF THE INVENTION

This invention relates generally to flow valves and, more specifically, to a booster valve with a flexible cantilevered sealing member responsive to a low differential pressure condition that permits increasing the fluid energy of a conveying line while at the same time preventing backflow through the booster valve.

CROSS REFERENCE TO RELATED APPLICATIONS

None

STATEMENT REGARDING FEDERALLY SPONSORED RESEARCH OR DEVELOPMENT

None

REFERENCE TO A MICROFICHE APPENDIX

None

BACKGROUND OF THE INVENTION

The concept of flow valves such as booster valves is well known in the art. Typically, booster valves are used in pneumatic conveying systems to increase the energy of the fluid in a conveying line by inserting a fluid, such as air at a higher pressure than the air in the conveying line, which assists in transporting materials through the conveying lines. Examples of such booster valves can be found in Steele U.S. Pat. Nos. 4,313,699; 4,708,535 and 5,345,969.

The booster valves need to withstand a hostile environment and be able to operate over an extended period of time as well as to prevent back low through the valve. In addition, in some circumstances it is desired to have the booster valve respond to extremely low differential pressure conditions. The present invention provides an improved flow valve or booster valve that has a sealing member that provides two conditions of operation, a flow condition and a no-flow condition. The booster valve includes a disk-like sealing member that cantilevers radially outward with a continuous annular peripheral region that flexes to engage an annular sealing surface on the interior of a housing when the pressures are equal on both sides of the sealing member. The partial engagement of the sealing member with the annular sealing surface in the housing is sufficient to prevent backflow at low pressure differentials. If the backflow pressure increases the central portion of the disk-like sealing member is displaced upward to further block off the internal fluid ports, which are located radially inward from the annular sealing surface on the interior of the housing. However, should the pressure differential across the booster valve drop to a displacement differential pressure condition the central portion of the disk-like sealing member and the cantilever portion of the sealing member engaging the annular sealing surface are axially displaceable and are supported in an out-of-the-way condition on a support platform. As a result, if air is used as the fluid, air can be added to the conveying line almost as soon as the pressure in the conveying line begins to drop. Thus, in one stage of operation the entire sealing member can seal off the fluid inlet ports and in another stage of operation a bias seal is formed by the resiliency of the sealing member. If the upstream pressure exceeds the downstream pressure the pressure on the sealing member by the fluid in the flow valve brings the sealing member to an out-of-the-way and supported condition that allows fluid to quickly flow through the flow valve.

SUMMARY OF THE INVENTION

Briefly, the invention comprises a flow valve having sealing member having a first condition for engaging a housing to prevent back flow and a platform for obstructing a flow passage through the flow valve with the platform supporting the sealing member in an out-of-the-way condition to allow fluid to flow through the flow valve. More specifically, the invention comprises a low valve or booster valve having a disk-like cantilevered sealing member with an annular peripheral scaling region sandwiched between a support platform that partially obstructs a flow passage in the flow valve and an annular sealing surface on the housing with the support platform normally holding the annular peripheral sealing region in sealing contact with an annular sealing surface when the pressure is equal on both sides of the sealing member with the sealing member displaceable to a fluid port blocking condition in response to an increase in the back pressure to thereby seal off fluid ports located radially inward from the peripheral sealing region. The sealing member is displaceable onto the support platform when an inlet pressure exceeds an outlet pressure to allow the support platform to support the sealing member in an out-of-the-way condition as fluid flows from an inlet to an outlet of the flow valve.

BRIEF DESCRIPTION OF THE DRAWINGS

FIG. 4 is a sectional view of the booster valve of FIG. 3 in the open condition;

FIG. 19 shows the flow valve of FIG. 13 in the zero pressure differential condition;

FIG. 20 shows the flow valve of FIG. 13 in a boost condition wherein a fluid is directed through the flow valve as the sealing member is supported in an out-of-the-way condition on a platform in the flow valve; and FIG. 21 shows the flow valve of FIG. 13 in the closed condition with the sealing member preventing backflow through the flow valve.

DESCRIPTION OF THE PREFERRED EMBODIMENT

Figure 1:
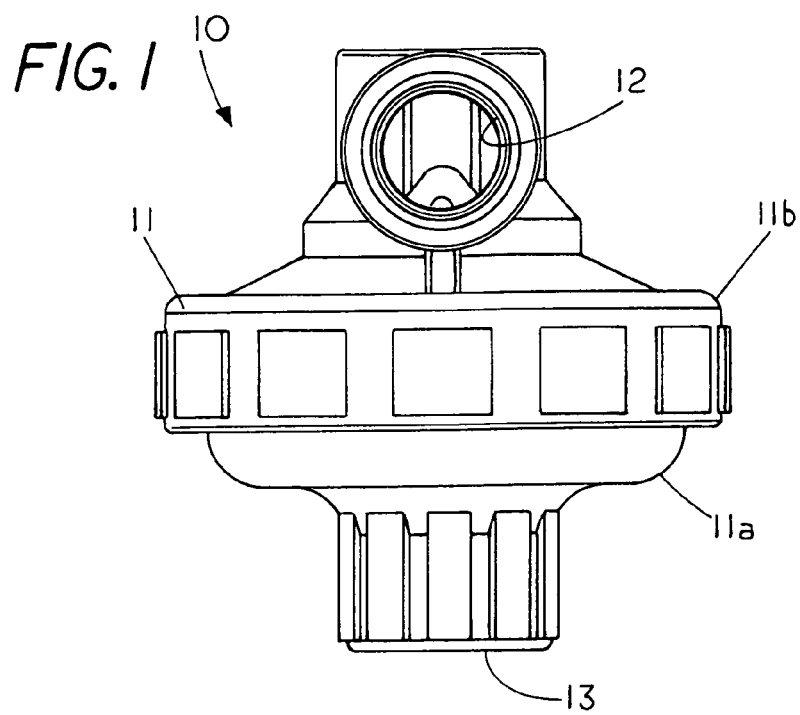
FIG. 1 is a front view of the booster valve of the present invention.
Figure 3:
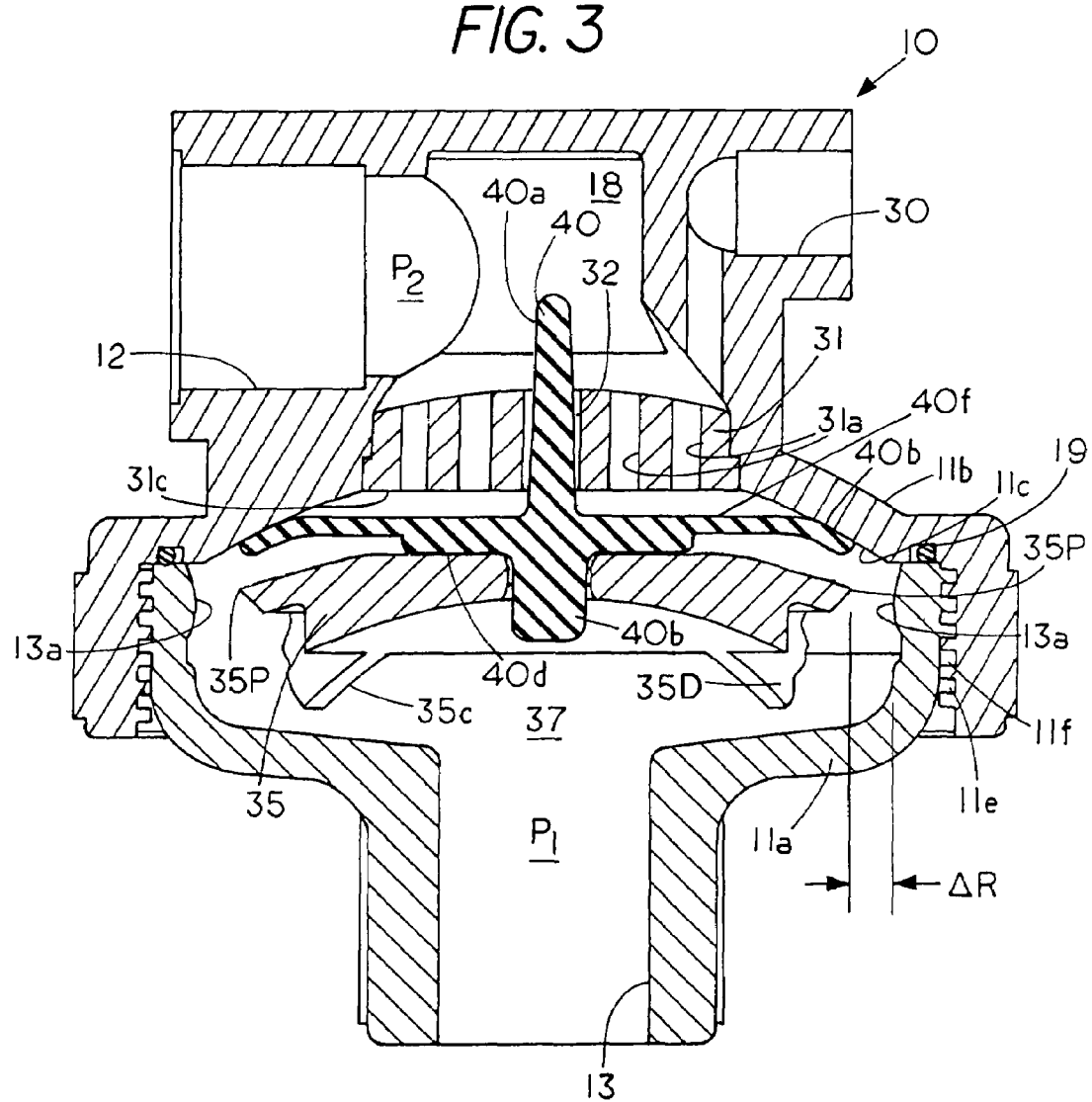
FIG. 3 is a sectional view of the booster valve of FIG. 3 in the normally closed condition.

FIG. 1 shows a front view of a flow valve or booster valve 10 having a housing 11 comprised of a lower portion 11a which is threadingly engaged with an upper portion 11b through a set of male and female threads (see FIG. 3 and FIG. 4). The top end of housing 11 includes an inlet 12 to allow fluid to enter the booster valve 10 and the lower portion of housing 11 includes an outlet 13 for directing fluid therethrough.

Figure 2:
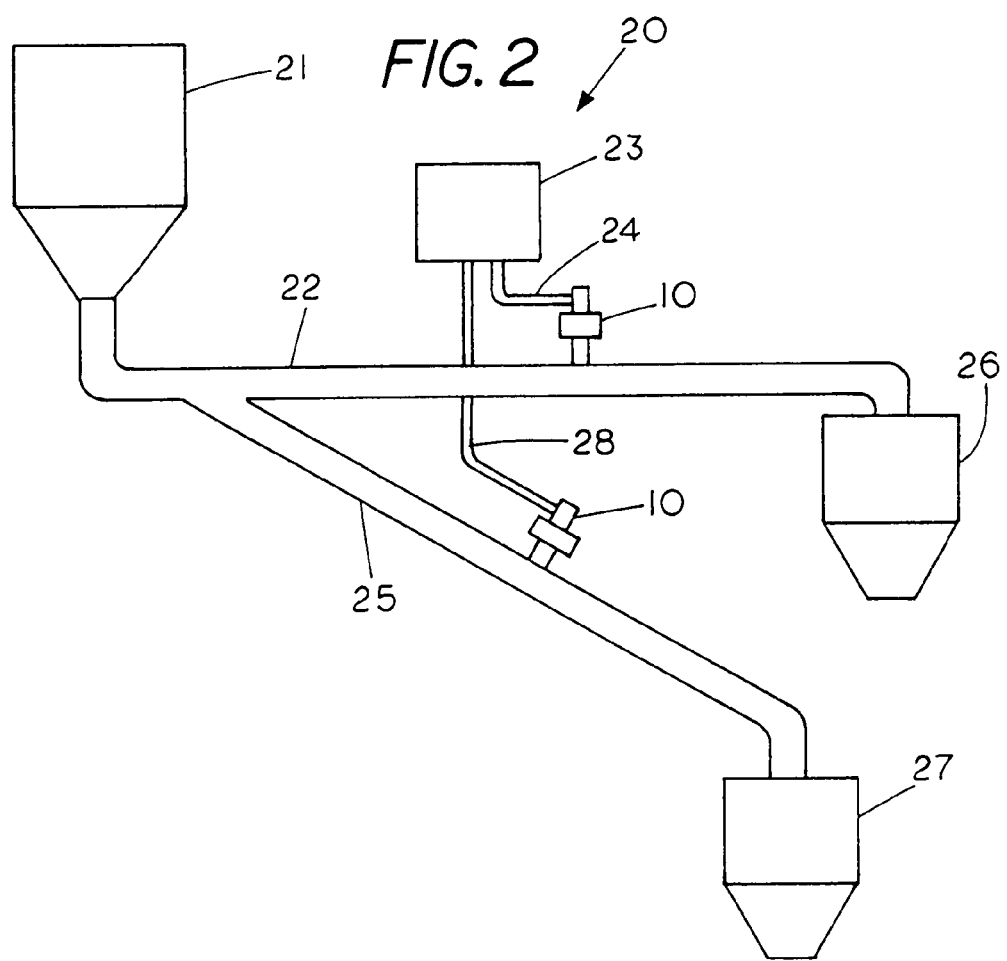
FIG. 2 is conveying system with booster valve of FIG. 1 located on the conveying lines of the conveying system.

FIG. 2 shows a typical conveying system 20 wherein a bin 21 for receiving material is used to supply remote bins 26 and 27 through conveying lines. The material in bin 21 is fed to bin 26 through conveying line 22 and the material in bin 21 is also fed to bin 27 through conveying line 25. Since each of bins 26 and 27 are remotely located from bin 21 frictional losses can reduce the flow thorough the conveying line and it may be necessary to assist the flow in the conveying lines by introducing a higher pressure fluid such as air into the conveying lines. In the system shown, a source of pressurized fluid 23 supplies air through conduit 24 to booster valve 10 on conveying line 22 and similarly supplies air through conduit 28 to booster valve 10 on conveying line 25.

In operation of pneumatic conveying system 20 additional material conveying energy is in the form of higher pressure air is injected into the conveying lines from the high pressure air to assist in the transfer of material to bins 26 and 27. As the booster valves 10 also operates as a check valve any materials in the conveying lines are precluded from flowing into the source of high pressure air 23 even it the pressure in the conveying lines 22 and 25 should accidentally exceed the pressure of the fluid in the source of high pressure air 23.

FIG. 3 shows a cross sectional view of the booster valve 10 of the present invention in the normally closed condition when the inlet pressure $P_2$ and outlet pressure $P_1$ are equal. Booster valve 10 comprises an upper housing 11b having an inlet 12 and an optional port 30 for attaching a pressure gauge or the like thereto. Upper housing 11b connects to lower housing 11a through threads 11e and 11f. A sealing ring 19 extends between upper housing 11b and lower housing 11a to form a sealed chamber or flow passage 37 in housing 11. Located in upper housing 11b is a flows insert 31 or flow straightener that forms an upper base with a set of flow openings 31a that are spaced circumferentially around the insert 31 to direct fluid from chamber 18 to impinge on sealing member top surface 40f of sealing member 40. Located in the center of insert is a locator 32 comprising a cylindrical sidewall that retains locator 40a and hence sealing member from laterally displacement while still permitting axial displacement of sealing member 40. With sealing member in the position shown in FIG. 3 the top surface 40f is spaced from a sealing region support surface 31c on the underside of insert 31. The cantilevered sealing engagement of the peripheral region 40b of sealing member 40 with annular sealing surface 11c, which is beveled to angular intercept the peripheral sealing region to produces a bias seal so that the outlet is always sealed off from the inlet. That is the sealing member flexes to form a seal under conditions of pressure equilibrium. Consequently, even a slight increase in downstream pressure $P_1$ over the upstream pressure $P_2$ cannot result in a backflow from the outlet to the inlet since the sealing member is in a biased closed condition due to the resiliency of the scaling member 40 and the cantilevered engagement of the sealing member with the housing.

Figure 9:
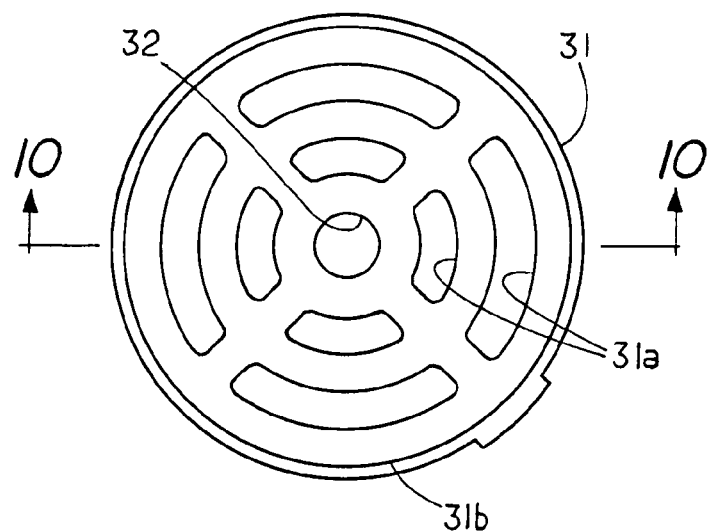
FIG. 9 is a top view of a flow insert for the booster valve of FIG. 1.
Figure 10:
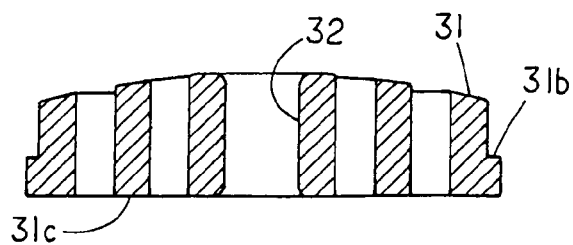
FIG. 10 is a sectional view of the flow insert of FIG. 9 taken along lines 10-10.

The flow insert 31 is shown in an isolated top view in FIG. 9 and includes a set of flow passages 31a that are circumferential spaced around the flow inset. The locator 32 is centrally positioned in the flow insert 11. Located on the outer peripheral edge of flow insert 31 is a ledge 31b that permits flow insert to be hand mounted into a mating lip on the top housing 11b as shown in FIG. 3. Thus the insert can be spaced in an operative position without the aid of tools. FIG. 10 shows an isolated view of the flow insert revealing the ledge or lip 31b that forms a stop as the insert is mounted in housing 11.

Figure 5:
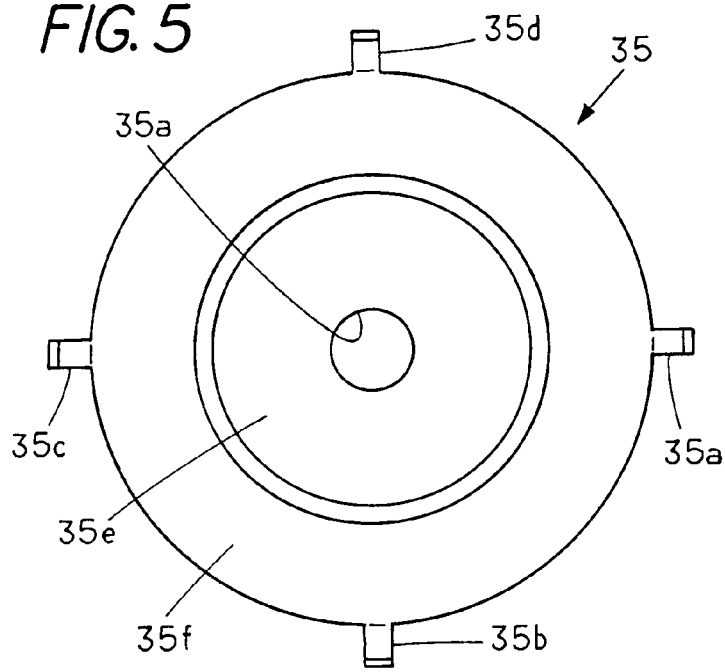
FIG. 5. is a top view of a platform insert for positioning in a flow passage of the booster valve of FIG. 1.
Figure 6:
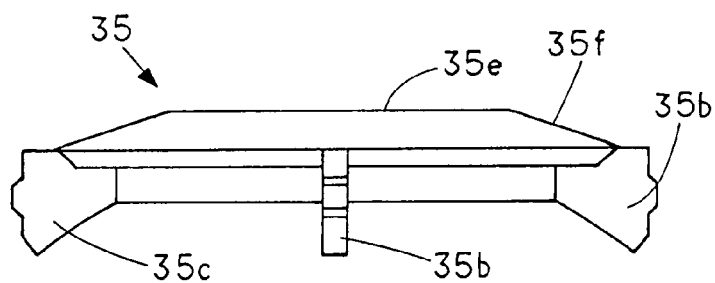
FIG. 6 is a side view of the platform insert of FIG. 5.
Figure 7:
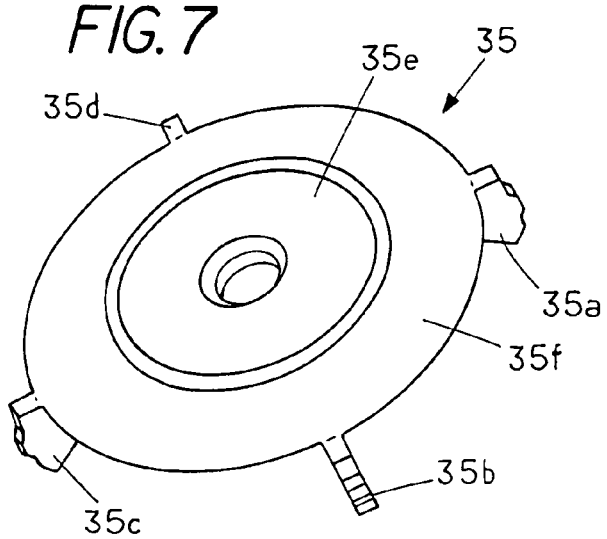
FIG. 7 is a perspective view showing the top side of the platform insert of FIG. 5.
Figure 8:
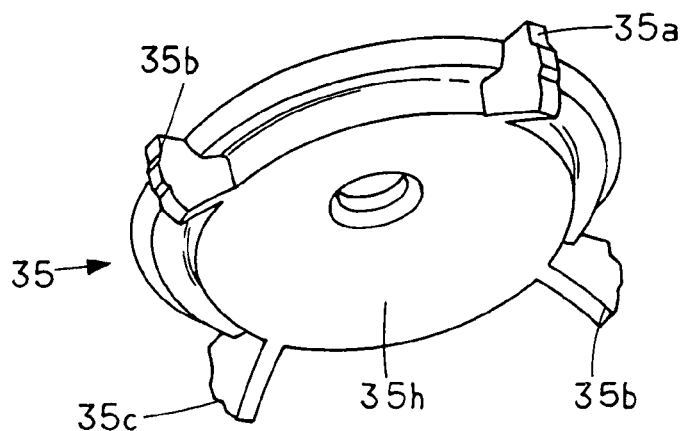
FIG. 8 is a perspective view showing the bottom side of the platform insert of FIG. 5.

Located in housing 11 is a platform 35 that obstructs the flow of fluid through the housing. That is, platform 35 is centrally supported in a flow region 37 within the housing 11 to produce a peripheral or annular flow passage past platform lip 35p. Platform 35 is shown in greater detail in FIGS. 5-8. FIG. 5 shows a top view of a circular platform 12 with supports 35a, 35b, 35c and 35d extending radially outward for engaging housing 11a to centrally support platform 35 in an obstructed condition so that fluid that flows through the housing must flow around the peripheral edge 35p of platform 35. The top side of platform 35 includes a circumferential flat section 35e and a peripheral beveled region 35f which is more clearly visible in FIG. 6. FIG. 3 shows the beveled region 35f is located proximate the beveled sealing region 11c. A locator 35g is positioned in the center of platform 35 and comprises a cylindrical side wall that can retain a mating locator from the sealing member 40 therein. FIG. 5 shows the top view of the platform 35 with the length of the supports or legs 35a, 35b, 35c and 35d indicated by x. FIG. 7 shows a top perspective view of the platform and FIG. 8 shows a bottom perspective view illustrating that each of the supports or leg 35a, 35b, 35c and 35d extend radially outward from the platform 35.

FIG. 3 shows that platform 35 is held in the central flow region to produce a flow obstruction by the radially extending legs 35c and 35d and also by the legs 35a and 35b which are not visible in the sectional view. The platform 35 includes an outer circumferential lip 35p that is spaced a distance ΔR from a circumferential region 13a in the housing 13 to create an annular flow passage around the peripheral edge of platform 35.

In the embodiment shown in FIG. 3 a disk-like sealing member 40 is shown positioned between flow insert 31 and partially supported by platform 35. The sealing member 40 is shown in an isolated side view in FIG. 11 and in an isolated perspective view in FIG. 12. The sealing member comprises a flat disk 40b made from a flexible materials such as an elastomer. Located in the center portion of sealing member 40 is a top locator 40a, which comprises a post, and located in the central portion of sealing member 40 on the opposite side is further locator 40c, which also comprises a post which extends from sealing member 40. In the embodiment shown the sealing member 40 the locators 40a and 40c are made from a resilient material such as rubber or the like. However, the locators 40a and 40c can be made from other materials since they are used to maintain the central location of the sealing member. The scaling member 40 is preferably a one piece molded member that is positioned between platform 35 and insert 31; however, if desired the seal 40 could be formed of multiple components.

Figure 11:
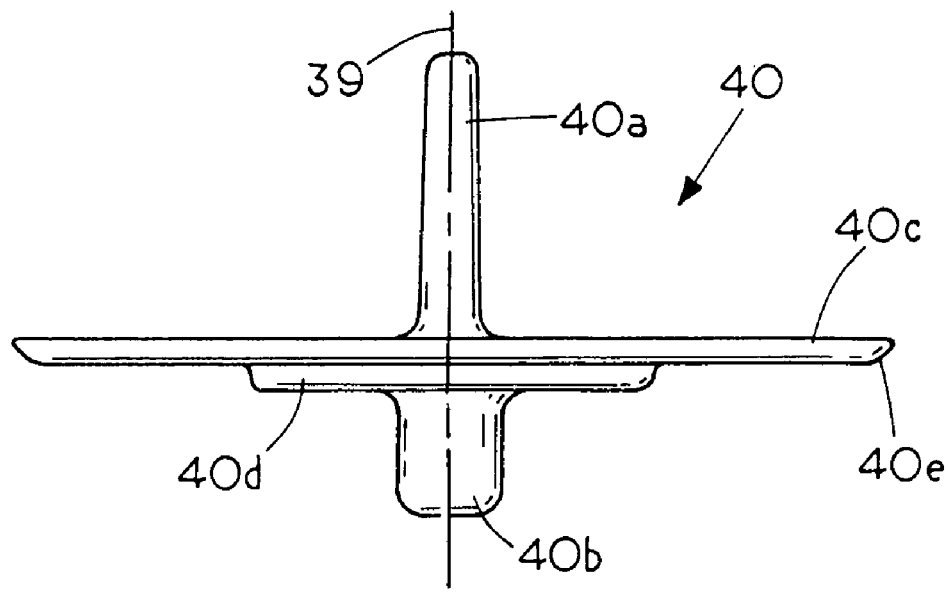
FIG. 11 is a side view of the sealing member in the booster valve of FIG. 1.
Figure 12:
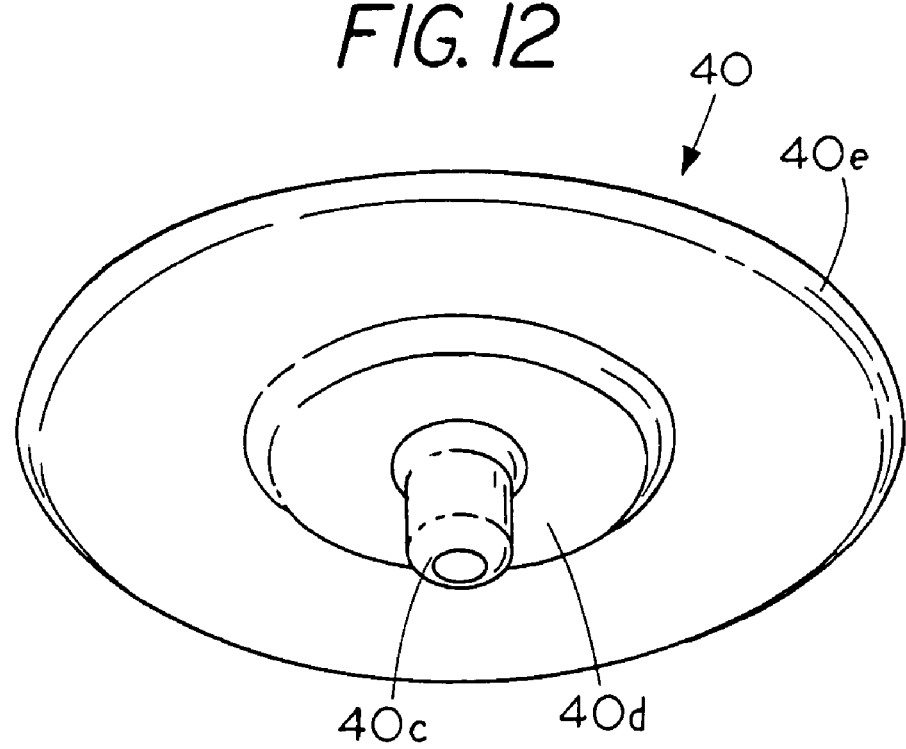
FIG. 12 is a perspective view of the sealing member of FIG. 11.

FIG. 11 shows a side view of the sealing member 40 in the relaxed state or condition with the sealing member extending out substantially perpendicular to a central axis 39 of the locators 40*a* and 40*b*. The located 40*a* comprises an upper centering member and similarly the locator 40*b* comprises a lower centering member. Locators 40*a* and 40*b* can be made from the elastomer material as shown or from other material that can be secured to the sealing member 40. The purpose of the locator is to maintain the sealing member in a central location when the booster valve is in a flow condition or a non-flow condition. A flange 40*d* extends parallel along a portion of the bottom side of sealing member 40 with locator 40*b* forming a hub to flange 40*d*. Thus sealing member 40 includes both upper and lower locators that allow the sealing member to be restrained from radial displacement but permit axial displacement of sealing member 40.

Figure 3A:
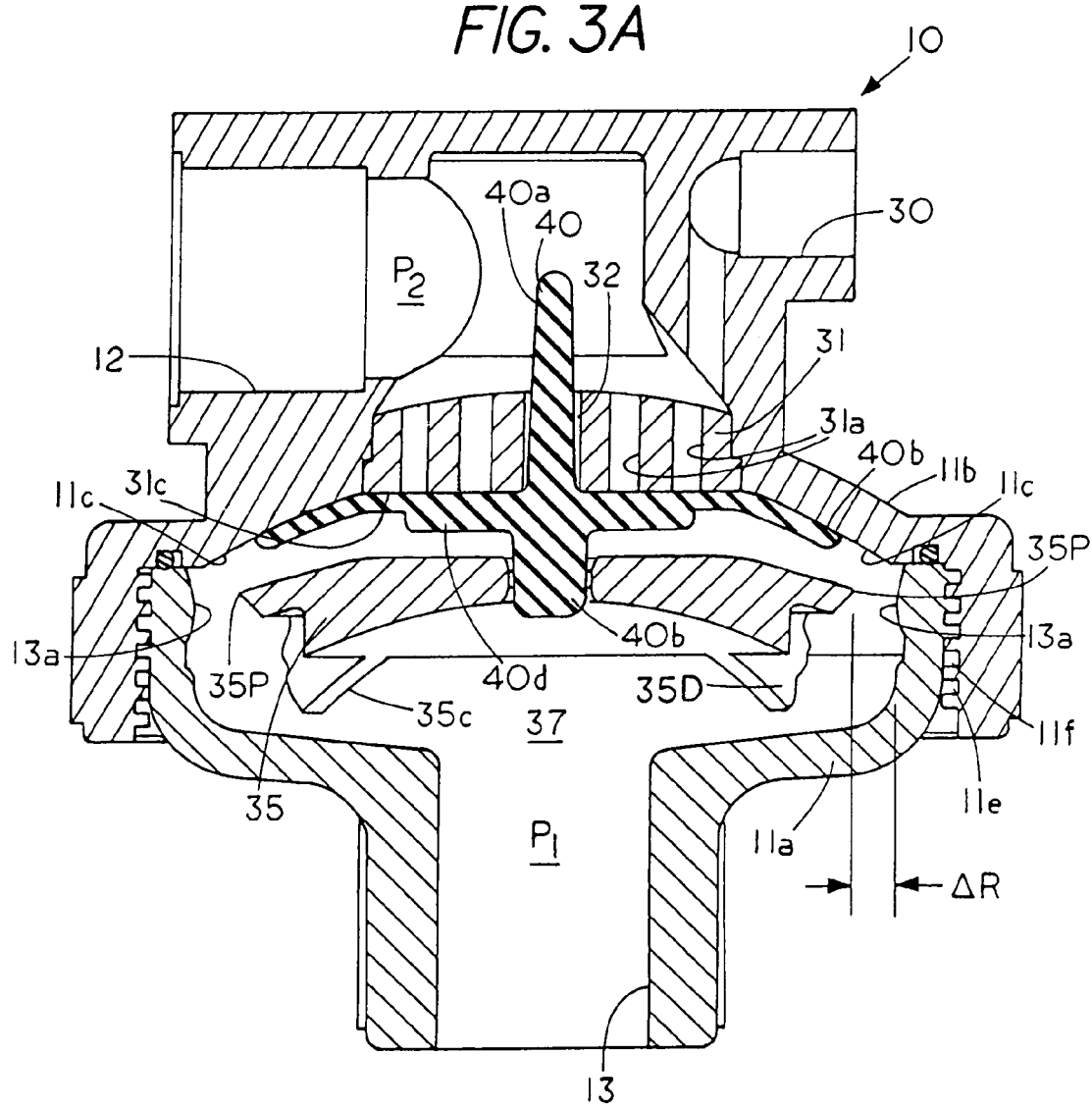
FIG. 3A is a section view of the booster valve of FIG. 3 in a supported condition wherein the back pressure substantially exceeds the input pressure to the booster valve.

FIG. 3 shows the flange 40*d* of flexible member 40 supported by platform 35 with the outer peripheral region 40*b* of sealing member located in contact with an annular portion or annular sealing region 11*c* of housing 11*b*. That is, the sealing member normally extends in a cantilevered manner radially outward as shown in FIG. 11; however, when inserted in the housing the flange 40*d* engages the platform 35 to hold the sealing member 40 upward so that the peripheral region of the sealing member is in contact with the annular sealing portion 11*c* of housing 11*b* to form a bias seal that prevents backflow past the sealing member 40. Consequently, fluid from outlet 13 can not flow past sealing member 40*b* since any increase in pressure region 37 causes the sealing member 40*b* to further seal off the flow through the valve 10. That is, if the pressure increases further the entire sealing member 40 is brought against the lower support side 31*c* of How insert 31 which prevents backflow through the valve 10. FIG. 3A illustrates this condition when flow through valve 10 is blocked by sealing member 40 which extends across the flow ports 31*a*. FIG. 3A shows locator 40*a* can maintain the central location on die sealing member 40 by preventing radial displacement of the sealing member even though the sealing member 40 may be axially displaced in housing 11. Thus in the view illustrated in FIG. 3 and FIG. 3A backflow through the valve 10 as long as the downstream pressure $P_1$ is equal to or greater than the upstream pressure $P_2$ with the sealing area between the sealing member and the housing increasing even though the downstream pressure $P_1$ increases substantially. Consequently the valve 10 can operate over a wide range of pressure differentials without a blowout of the sealing member 40 occurring.

In the event the downstream pressure $P_1$ falls below the upstream pressure $P_2$ it is desirable to add fluid under pressure to bring the pressure and hence the conveying energy up to the proper level. With the present invention the sealing member 40 unseals itself in response to a pressure differential there across as the pressure $P_2$ exceeds the pressure $P_1$. This allows fluid to flow from higher pressure region $P_2$ to the low pressure region $P_1$.

FIG. 4 shows the flow valve 10 in the open condition. In the open condition the sealing member 40 with the peripheral edge 40*b* is flexed downward and is supported by the beveled peripheral edge 35*f* of platform 35. That is the higher pressure air $P_2$ now forces the unsupported peripheral edge 35*f* away from the annular sealing surface 11*c* and allows fluid to flow through the fluid passages 31*a* as indicated by the arrows. The fluid pressure displaces the sealing member 40 until the platform 35 supports the sealing member 40 thereon. The beveled annular surface 35*f* permits the elastomer scaling member 40 to be displaced into an out-of-the-way condition on platform 35. As can be seen by the arrows the fluid then flows radially outward along the scaling member 40*b* and over the edge 11*c* until the fluid enters the outlet 13. In this condition fluid such as pressurized air can flow from inlet 12 to outlet 13 and into a pipeline to boost the pressure and energy of the conveying stream in the conveying line. As the platform obstructs the flow passage in the housing the sealing member which is deflectable and displaceable can be supported by the platform in an out-of-the way condition by the pressure of the incoming fluid. This allow fluid to flow along sealing member 40 and past the peripheral edge 40*f* and into the annular flow passage formed between platform 35 and housing 11.

Thus the present invention comprises a flow valve having a housing 11 having a flow passage 47 therethrough and a platform 35 obstructively positioned in the flow passage in the housing with a resilient sealing member 40 located proximate the platform 35. In the relaxed condition of equal pressure of $P_2$ and $P_1$ the sealing member 40 normally engages a sealing region 11*c* in the housing 11 to prevent a flow of a fluid in a first direction through the flow valve, the sealing member 40 is resiliently displaceable onto the platform 35 in response to a flow of fluid in a second direction through the flow valve with the platform 35 supporting the sealing member 40 in an out-of-the-way condition. The flow valve can thus be a booster valve 10 for a pneumatic conveying system wherein housing has an inlet 12 and an outlet 13 with a platform 35 located in a flow passage in the booster valve. The valve 10 includes a sealing member 40 with the platform 35 normally holding a sealing region 40*b* of the sealing member in a partially flexed and scaled condition against a portion 11*c* of the housing to prevent a backflow from the outlet to the inlet. The sealing member 40 is flexible in response to a higher pressure at the inlet than the outlet to permit a fluid pressure differential across the sealing member 40 to bring sealing member from the sealed condition (FIG. 3 and FIG. 3A) to an unsealed condition (FIG. 4) to thereby permit a booster flow of fluid from inlet 12 to outlet 13.

While gasses such as air are most frequently used in the flow valves and booster valves the present invention is also useable with fluids such as liquids. In addition, the flow valve of the present invention can also be used as a check valve to prevent backflow.

Figure 13:
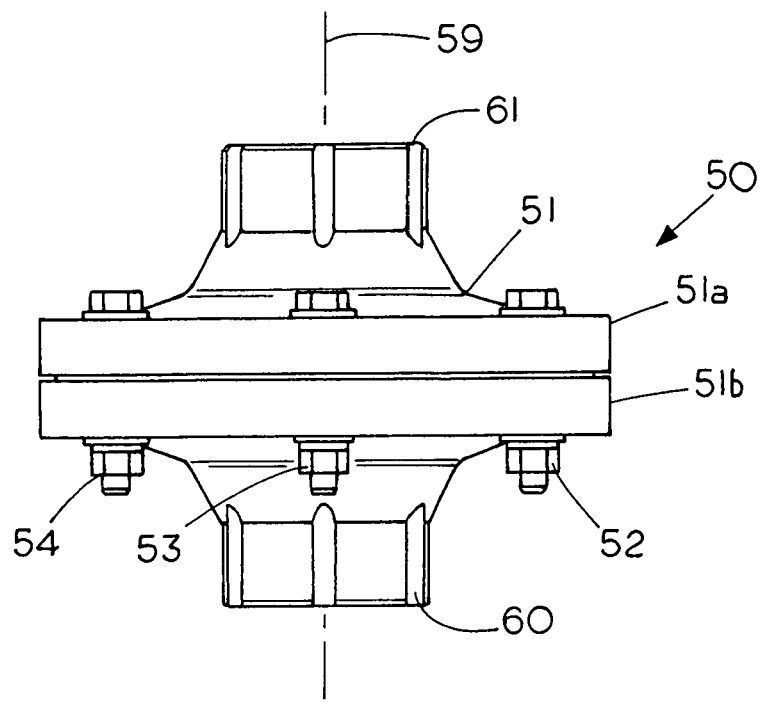
FIG. 13 is a front view of an alternate embodiment of a flow valve.
Figure 14:
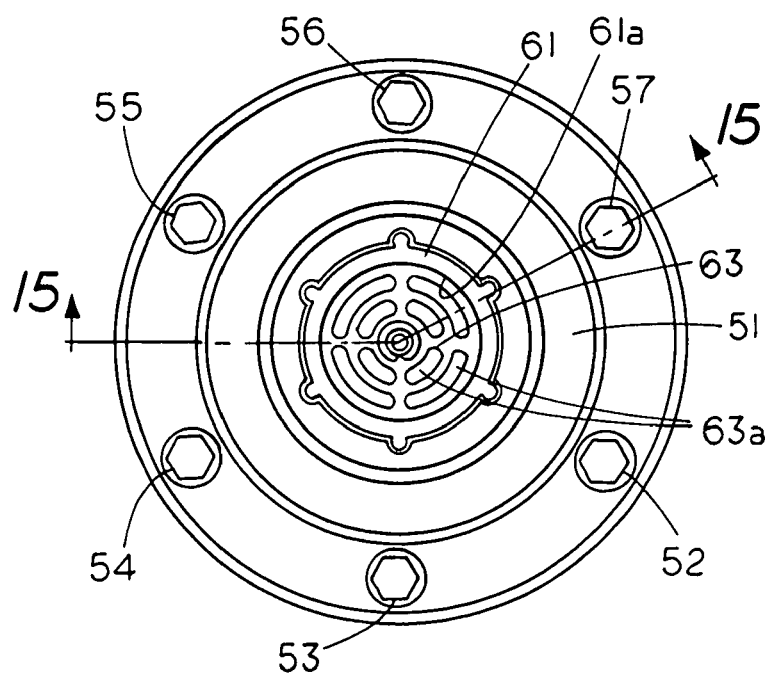
FIG. 14 is a top view of the flow valve of FIG. 14.

FIG. 13 is a front view of an alternate embodiment of an inline flow valve 50 having a housing 51 comprising an upper member 51*a* and a lower member 51*b* that are held proximate each other by a set of bolts 52, 53, 54, 55, 56 and 57 (see FIG. 14). Flow valve 13 includes an outlet 60 that extends from one end of housing 51 and an inlet 61 that extends from the opposite end of housing 51. In the flow valve of FIG. 15 the inlet 61 and outlet 60 are located along a central axis 59.

FIG. 14 is a top view of the flow valve of FIG. 14 showing inlet 61 with an inlet passage 61*a* centrally positioned with respect to housing 51. A flow straightener 63 having a set of concentrically spaced flow passages 63*a* arc visible through the inlet port 61. Inlet 61 includes a thread 61*a* to enable one to threadingly connect the valve to a source of fluid.

Figure 15:
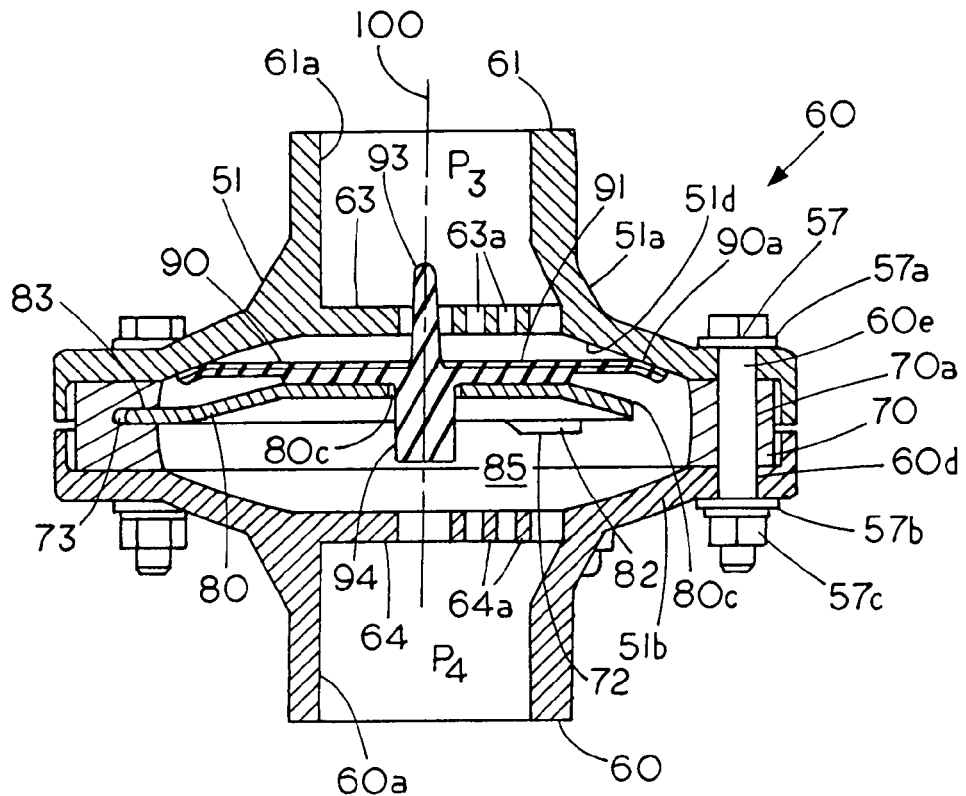
FIG. 15 is a cross section view of the flow valve of FIG. 14 taken along lines 15-15 of FIG. 14.

FIG. 15 is a cross section view of the flow valve 60 of FIG. 14 taken along lines 15-15 of FIG. 14. The flow valve includes flow insert 63 which can be formed as part of upper housing 51*a* or as a separate component as shown in FIG. 3. Similarly, the lower housing 64 includes a set of concentrically positioned flow passages 64*a* for directing fluid therethrough. In the embodiment of FIG. 15 the flow valve upper housing 51*a* and the lower housing 51b which form flow valve housing 51 are held proximate each other by a set of six circumferentially spaced bolts (see FIG. 14). FIG. 15 shows bolt 57 having a washer 57a on one end and a washer 57b and a nut 57c on the opposite end with the bolt 57 extending through a hole 60e in housing 51a and a hole 60d in housing 51b. A platform support ring 70 is sandwiched therebetween with support ring 70 having a hole 70a for extending a bolt therethrough. As each of the other bolts are identically positioned they are not described herein. Thus bolt 57 and nut 57c as well as there counterparts coact to hold the upper housing 51a and the lower housing 51b in a sealed condition.

FIG. 15 shows the disk-like sealing member 90 having an outer peripheral sealing region 90a in a flexed condition with the peripheral sealing region forming a bias seal due to the inherent resiliency of the sealing member 90. That is, the sealing member 90 is formed so as to extend laterally or radially outward from an upper locator 93 or integral post and a lower locator 94 or integral post both of which extend along a central axis 100. The outer peripheral region 90a of sealing member flexes from a normal radially extended condition to engage the housing sealing surface 51d thus holding the outer peripheral region 90a against sealing surface 51d to form a bias seal, between the inlet and the outlet of the valve 60. That is, the bias seal isolates the inlet from the outlet without the aid of a fluid pressure differential across the sealing member 90. However, when the inlet pressure becomes greater than the outlet pressure the bias seal can be overcome to open the valve 60 to allow fluid to flow from inlet 61 to outlet 60. On the other hand, when the outlet pressure increases and becomes greater than the inlet pressure the sealing member 90 is displaced upward to a pressure sealed condition that blocks fluid flow through the flow ports 63a.

Figure 16:
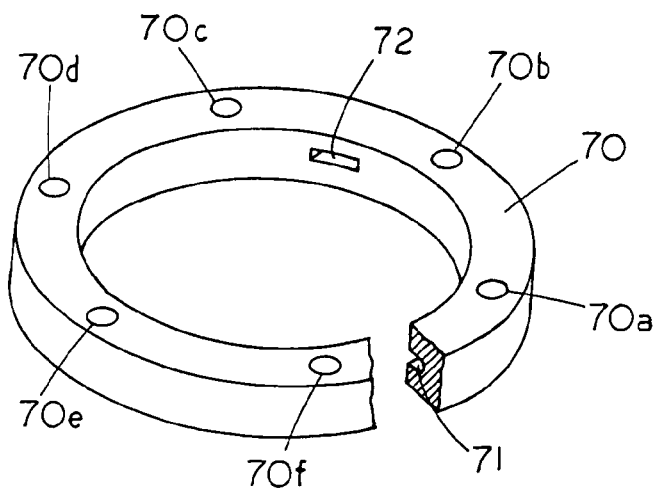
FIG. 16 is a cutaway perspective view of a platform support ring.

FIG. 16 is a cutaway perspective view of platform support ring 70 having a set of peripheral spaced holes 70a, 70b, 70c, 70d, 70e, and 70f for receiving bolts to assembly the upper housing 51a to the lower housing 51b. Platform support ring 70 includes a set of there identical platform ear slots that are spaced equal distance from each other to provide support for the platform 80. Only ear slots 72 and 71 arc visible in FIG. 16. Each of the ear slots receive an ear of platform 80 and hold the platform 80 in an obstructed and central condition in passage 85.

Figure 17:
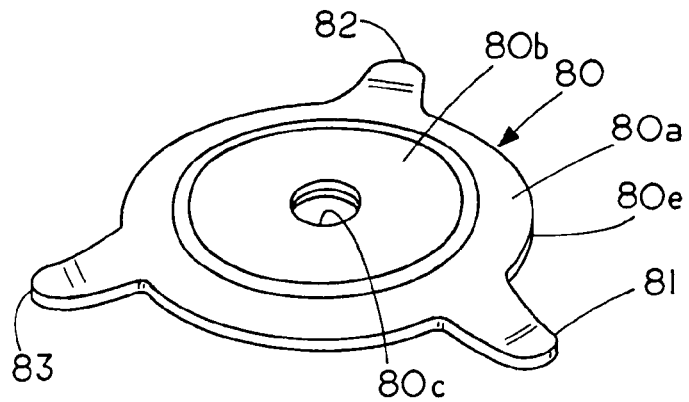
FIG. 17 is a perspective view of a platform having ears for engaging with the platform support ring of FIG. 16.

The platform 80 is shown in isolated view in FIG. 17. Platform 80 is similar to platform 35 in that it provides support for the sealing member when the flow valve is in a boost condition. Platform 80 includes a set of radially extending ears 81, 82 and 83 that are inserted into the ear slots in platform support ring 70. Platform support 80 is centrally positioned to provide an obstruction to a flow passage 85 in the housing 51. That is, platform 80 obstructs a central flow of fluid through the housing 51 but allows flow past a peripheral lip 80e. That is, platform 80 is centrally supported in a flow region 85 within the housing 51 to produce a peripheral or annular type flow passage past platform lip 80e. The top side of platform 80 includes a circumferential flat section 80b that supports sealing member 90 and a peripheral beveled region 80c that does not support sealing member 90 when the sealing member is in a condition with little or no pressure differential across the sealing member. A locator 80c is positioned in the center of platform 80 and comprises a cylindrical side wall that can retain a mating locator 94 or post extending from the sealing member 90 to prevent lateral or radial displacement of sealing member 90 as the sealing member moves from an open condition to a sealed condition or vice versa.

Figure 18:
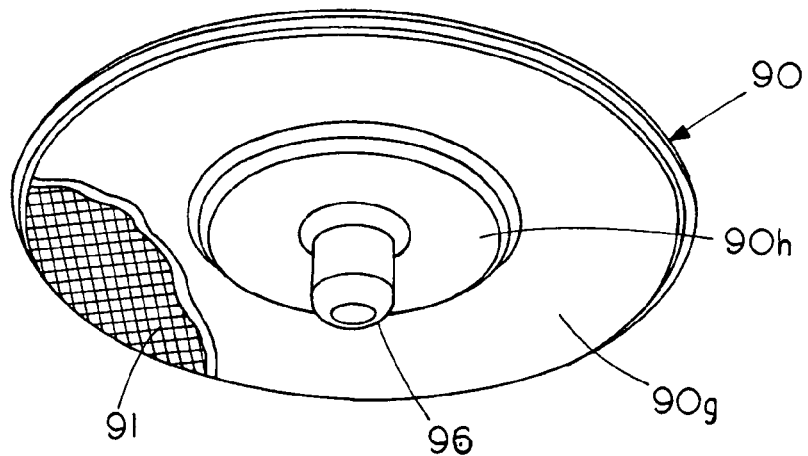
FIG. 18 is a perspective of a platform with ears for engaging the support ring of FIG. 16.

FIG. 18 is a cutaway perspective view of an alternate embodiment of a sealing member 90. Sealing member 90 is identical to sealing member 40 except that sealing member 90 contains a support fabric 91 that is embedded in the sealing member 90 to provide additional structural support for the sealing member while allowing the scaling member to flex in response to forces thereon. That is, the fabric can be used to enable the sealing to member to have a higher blow out pressure, i.e. a differential pressure condition that would cause the sealing member to be blown out of the valve 60.

Figure 18A:
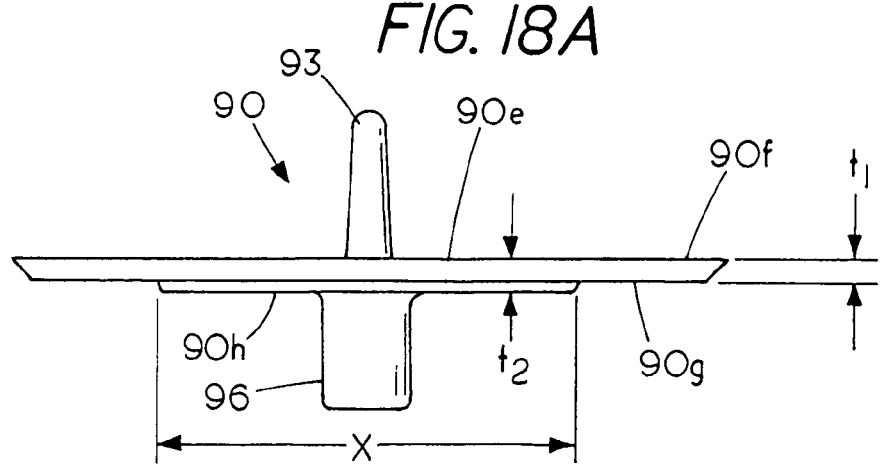
FIG. 18A is a cutaway perspective view of an alternate embodiment of a sealing member having a fabric support therein.

FIG. 18a is a side view of sealing member 90 and includes an outer peripheral sealing region 90f having a thickness $t_1$ which is generally of lesser thickness than the central sealing region 90e of thickness $t_2$ to produce a more massive central port sealing region. The central sealing region 90e is provided with a diameter x, which is substantially equal to the diameter of the flow insert 63 so as be able to cover the ports 63a. In this embodiment the two different thickness allow the sealing member to be responsive to seal under different pressure conditions. That is, the outer peripheral region 90f flexes to provide sealing engagement under a zero pressure differential condition as illustrated in FIG. 15. This is referred to as a bias seal since no pressure differential across the sealing member is necessary to isolate the fluid in the inlet from the fluid in the outlet. However, if the back pressure i.e. the pressure in the outlet, increases substantially the central sealing member 90e which is thicker i.e. more massive than the outer portion 90f can withstand greater pressure differentials. FIG. 21 illustrates that by having the diameter of central sealing region x equal to or greater than the diameter x of the flow insert 63 the central sealing region 90e can block ports 63a. The massive central sealing region 90e can withstand substantial pressure differentials without blowout of the sealing member. FIG. 19 illustrates how the central region 90e provides a high pressure backflow seal with sealing region 90e in engagement with the under side 63b of flow insert 63 to block off the ports 63a therein.

FIG. 18 shows the sealing member 90 in cross section view with the fabric 91 extending therein. It should be pointed out that other reinforcing and flexible materials besides fabric can be used to provide additional support flow the sealing member 90.

FIGS. 19-20 show the various position of the sealing member 90 during the operation of the valve 60. FIG. 19 shows the sealing member 90 in a zero pressure differential condition, that is the pressure $P_3$ and the pressure $P_4$ are equal or substantially equal. In this condition, referred to as a bias seal condition, the outer peripheral portion of sealing member 90 is held in sealing engagement with an annular sealing surface 51d on the interior of housing 51 solely through the resilient engagement of the sealing surface 51d. In this condition an increase in a pressure differential across sealing member 90 can generate two different modes of operation of flow valve 60. If the inlet pressure $P_3$ is greater than the outlet pressure $P_4$ the bias seal is broken as the sealing member 90 is displaced downward until the sealing member 90 is supported by platform 80 as illustrated in FIG. 20. In this condition the fluid flows through the housing 60 and around the sealing member 90 which is held in an out-of-the-way condition in flow passage 85 in flow valve 60 by the platform 80. The arrows indicated the direction of now through valve 60.

If the outlet pressure $P_4$ exceeds the inlet pressure $P_3$ the flow valve 60 functions as a check valve to prevent back flow from outlet 60 to inlet 61. FIG. 21 shows that such an increase in fluid pressure differential causes the sealing member 90 to be displaced upward with the upper sealing surface 90a of the sealing member 90 supported by a support surface 63b on flow insert 63. In this condition the pressure differential provides the sealing force to hold the central sealing member 90e in a condition that blocks off ports 63a to prevent backflow through the flow valve 60. In addition the axial displacement of the sealing member positions the sealing member in a condition where the central sealing region 90e of the sealing member 90 can obtain greater support and thus prevent a blow out of the sealing member in the event that the outlet pressure substantially exceeds the inlet pressure.

Thus the present invention comprises multiple embodiments of a booster valve having a housing with an inlet and an outlet and a flexible sealing member in the housing at least partially flexed to form a bias seal to isolate a fluid in the inlet from a fluid in the outlet with the sealing member responsive to a higher pressure at the inlet than the outlet to overcome the bias seal and displace the sealing member from an isolated condition to an open condition to thereby permit a booster flow of fluid from the inlet to the outlet with one side of the sealing member supportable by a platform, which can be a solid structure as shown or a porous or flexible structure, that can hold the sealing member in an out-of-the-way condition. If the pressure on the outlet should exceed the pressure on the inlet the sealing member which is restrained from lateral displacement by posts 95 and 96 is supported by the flow insert 63 to block ports 63a to prevent flow from the outlet to the inlet even though the outlet pressure should substantially exceed the inlet pressure.

I claim:

1. A booster valve comprising:
   a housing having an inlet and an outlet;
   a platform located in said housing, said platform located in a flow passage in the booster valve and centrally supported in the housing to permit a peripheral fluid flow past a circumferential edge of the platform;
   a one-piece resilient sealing member, having an integral flange extending along a central portion of the sealing member and an integral locator post extending from a first side of the sealing member and a further integral post extending from the opposite side of the sealing member, said platform normally supporting said flange with said flange and an inherent resiliency of said resilient member holding a peripheral sealing region of said resilient sealing member in a partially flexed and sealed condition against an annular portion of said housing to form a bias seal to prevent a backflow from said outlet to said inlet, said peripheral sealing region of said sealing member flexing in response to a higher pressure at said inlet than said outlet to permit a fluid pressure differential across said sealing member to bring said peripheral sealing region of said sealing member from said sealed condition to an unsealed condition to thereby permit a booster flow of fluid from said inlet to said outlet,
   said locator post engaging said platform to maintain said sealing member in a central condition in a flow region of the housing with the locator post and the further locator post coacting to maintain the sealing member in a central condition in the flow region of the housing.

2. The booster valve of claim 1 wherein the sealing member comprises an elastomer with the flange having a greater thickness than the peripheral sealing region of said sealing member.

3. The booster valve of claim 1 wherein the locator post extends into a locator recess on the platform.

4. The booster valve of claim 1 wherein the platform has a beveled peripheral support region.

5. The booster valve of claim 1 wherein the sealing member comprises a flexible disk having a hub.

6. The booster valve of claim 1 wherein said platform supports said sealing member when the sealing member is an unsealed condition to permit flow past a peripheral edge of the sealing member.

7. The booster valve of claim 1 wherein an impingement of fluid on an upstream side of said sealing member directs said sealing member toward said platform with said platform providing a support to maintain the sealing member in an out-of-the-way condition.

8. The booster valve of claim 1 wherein the locator post retains the sealing member from lateral displacement while permitting flexing of said sealing member from a flow condition to a non-flow condition and vice versa.

9. The booster valve of claim 1 wherein the sealing member contains a flexible peripheral sealing region for sealing against said housing.

10. A booster valve comprising:
    a housing having an inlet and an outlet, said housing including an insert having a set of flow openings for straightening the flow of fluid to flow therethrough with said insert including a locator to maintain the sealing member in a central condition in the flow passage;
    a platform located in said housing, said platform located in a flow passage in the booster valve;
    a one-piece sealing member having a top surface for impingement of the flow of fluid through the insert, said sealing member having a locator post extending from a first side of said resilient sealing member and a further locator post extending from an opposite side of the resilient sealing member, said platform normally holding a peripheral sealing region of said sealing member in a partially flexed and sealed condition against a portion of said housing to prevent a backflow from said outlet to said inlet, said sealing member having a central region thicker than said peripheral sealing region to enable the central region to withstand a greater pressure without a blow out of the sealing member, said sealing member flexible in response to a higher pressure at said inlet than said outlet to permit a fluid pressure differential across said sealing member to bring said sealing member from said sealed condition to an unsealed condition to thereby permit a booster flow of fluid from said inlet to said outlet.

11. A booster valve comprising:
    a housing having an inlet and an outlet;
    a flow insert having a first diameter;
    a platform located in said housing, said platform located in a flow passage in the booster valve and centrally supported in the housing to permit a peripheral fluid flow past a circumferential edge of the platform;
    a sealing member wherein the sealing member comprises a disk having a central region of greater thickness than a peripheral region of the sealing member with the diameter of the central region greater or equal to the diameter of the flow insert, said disk having a locator extending from each side of the disk, said platform normally holding a sealing region of said sealing member in a partially flexed and sealed condition against a portion of said housing to prevent a backflow from said outlet to said inlet, said sealing member flexible in response to a higher pressure at said inlet than said outlet to permit a fluid pressure differential across said sealing member to bring said sealing member from said sealed condition to an unsealed condition to thereby permit a booster flow of fluid from said inlet to said outlet.

12. A booster valve comprising:
    a housing having an inlet and an outlet;

a platform located in said housing, said platform located in a flow passage in the booster valve;

a resilient sealing member having a central region thicker than an annular peripheral sealing region, said sealing member located between a flow through insert and the platform, whereby an inherent resiliency of said sealing member coacts with said platform to normally hold the annular peripheral sealing region of said sealing member in a partially flexed and sealed condition against a portion of said housing to prevent a backflow from said outlet to said inlet, said sealing member flexible in response to a higher pressure at said inlet than said outlet to permit a fluid pressure differential across said sealing member to bring said sealing member from said sealed condition to an unsealed condition to thereby permit a booster flow of fluid from said inlet to said outlet; and a locator post engaging said platform to maintain said sealing member in a central condition in a flow region of the housing, said locator post is on a first side of the sealing member and a further locator post is located on an opposite side of the sealing member with the locator post and the further locator post coacting to maintain the sealing member in a central condition in the flow region of the housing.

13. A booster valve comprising:

a housing having an inlet;

a platform located in said housing, said platform located in a flow passage in the booster valve and peripherally spaced from the housing sufficiently so that when a peripheral region of the sealing member is brought into supporting engagement with the platform fluid can flow between the housing and the sealing member to permit peripheral flow past the peripheral edge of the platform;

a sealing member, said platform extending axially upward to normally hold a peripheral sealing region of said sealing member in a partially flexed and sealed condition against an annular portion of said housing to prevent a backflow from said outlet to said inlet, said sealing member flexible in response to a higher pressure at said inlet than said outlet to permit a fluid pressure differential across said sealing member to bring said sealing member from said sealed condition to an unsealed condition to thereby permit a booster flow of fluid from said inlet to said outlet; and a locator post engaging said platform to maintain said sealing member in a central condition in a flow region of the housing, said locator post located on a first side of the sealing member and a further locator post located on an opposite side of the sealing member with the locator post and the further locator post coacting to maintain the sealing member in a central condition in the flow region of the housing.

14. A flow valve comprising:

a housing having a flow passage therethrough;

a platform obstructively positioned in the flow passage in the housing, said platform is a solid disk centrally located in the flow passage to provide a peripheral flow passage therepast;

a resilient sealing member, the sealing member normally engaging a sealing region in the housing to prevent a flow of a fluid in a first direction through the flow valve, the sealing member resiliently displaceable onto the platform in response to a flow of fluid in a second direction through the flow valve with the platform supporting the sealant member around the sealing member and the support platform in an out-of-the-way condition, the sealing member supported in the normally sealing condition by the platform, the sealing member comprising an elastomer;

a locator integral with the resilient sealing member for engaging a mating locator in the platform to retain the sealing member proximate the platform; and a further locator integral with the resilient sealing member for engaging a flow insert to further restrain the sealing member from lateral movement while permitting axial displacement of the sealing member.

15. A pneumatic conveying system comprising:

a first bin;

a second bin;

a pneumatic conveying line connecting said first bin to said second bin;

a source of air;

a booster valve having an inlet and an outlet with the inlet connected to said source of air and said outlet connected to said pneumatic conveying line, said booster valve having a flow passage therein partially obstructed by a platform and a sealing member having an inherent resiliency sufficient to normally maintain the flow passage in a closed condition, said platform having a peripheral edge spaced from a circumferential region of said booster valve sufficiently so that when a peripheral region of the sealing member is brought into supporting engagement with the platform fluid can flow between said booster valve and said sealing member to permit peripheral flow past said peripheral edge, said sealing member displaceable onto the platform in response to a pressure in the conveying line falling below the pressure of the source of air to allow air to flow around the sealing member supported on the platform and into the conveying line to enhance the flow of materials through the conveying lines.

16. The pneumatic conveying system of claim 15 wherein the platform includes a locator and the sealing member includes a locator to prevent lateral displacement of said sealing member while allowing an axial displacement of said sealing member.

17. The pneumatic conveying system of claim 16 wherein the platform supports the sealing member in a sealing condition against the housing when there is no pressure differential between the inlet and the outlet.

18. A booster valve comprising:

a housing having an inlet and an outlet;

a resilient one-piece sealing member in said housing, said housing including an insert for fluid to flow therethrough with said insert including a locator to maintain the sealing member in a central condition in a flow passage, said resilient sealing member including a locator post extending from a first side of said resilient sealing member and a further locator post extending from an opposite side of the resilient sealing member, said resilient sealing member having a peripheral sealing region engaging an annular portion of the housing when pressure are equal on opposite sides of said sealing member to form a seal to isolate a fluid in the inlet from a fluid in the outlet while maintaining a central region of said sealing member in a spaced unsealed condition from said insert with said sealing member responsive to a higher pressure at said inlet than said outlet to overcome said seal and displace said sealing member from a sealed condition to an open condition to thereby permit a booster flow of fluid from said inlet to said outlet.

19. The booster valve of claim 18 including a platform located in said housing, said platform located in a flow passage in the booster valve to hold the sealing member in an-out-of-the way condition as a fluid flows from said inlet to said outlet.

20. The booster valve of claim 18 wherein the resilient sealing member includes a fabric reinforcement therein.

21. The booster valve of claim 18 wherein the flexing of said flexible sealing member is maintained solely by the support of the sealing member on a platform.

22. The booster valve of claim 18 wherein a higher pressure at said outlet than at said inlet displaces the sealing member from a bias condition to the sealed condition wherein the sealing member includes a further sealing that blocks off a fluid inlet port to thereby inhibit flow through said booster valve.

23. The booster valve of claim 19 wherein a higher pressure at said inlet than said outlet generates sufficient force to overcome a bias seal to permit fluid to flow through said valve.

24. A booster valve comprising:
a housing having an inlet and an outlet
a resilient sealing member in said housing, said housing including an insert for fluid to flow therethrough with said insert including a locator to maintain the sealing member in a central condition in a flow passage, said resilient sealing member at least partially flexed along a peripheral region to thereby form a bias seal when an inlet pressure and an outlet pressure are equal to isolate a fluid in the inlet from a fluid in the outlet with said sealing member responsive to a higher pressure at said inlet than said outlet to overcome said bias seal and displace the peripheral region of said sealing member from the bias seal condition to an open condition without displacing a central region of the sealing member to thereby permit a booster flow of fluid from said inlet to said outlet;
a locator extending from a first side of the sealing member and a further locator extending from the second side of the sealing member to maintain the sealing member in a central condition in the flow passage as the sealing member is displaced from a sealed condition to an open condition.

25. A booster valve seal comprising:
a resilient member located between a flow through insert and a platform of a booster valve housing, said resilient member extending radially outward from a central axis, said member having a central sealing region and a peripheral sealing region for sealing engagement wherein said central sealing region is maintained in a fixed position by said platform when an inlet pressure and an outlet pressure are equal with the peripheral sealing region flexes in response to a higher pressure at said inlet than at said outlet to allow a flow of fluid therepast;
a locator positioned at the central axis on a first side of the resilient member; and
a further locator extending from a second side of the resilient member, said locator and said further locator coacting to restrain the resilient member from lateral displacement.

26. The booster valve seal of claim 25 wherein the booster valve seal comprises a one piece elastomer.

27. The booster valve seal of claim 25 wherein the booster valve seal comprises a circular disk.

28. The booster valve seal of claim 25 wherein the central sealing region of the resilient member is thicker than the peripheral sealing region of the booster valve seal to thereby inhibit blowout.

29. The booster valve seal of claim 25 including a reinforcing member embedded therein.

* * * * *